United States Patent [19]

Zimmerman et al.

[11] 4,136,240

[45] Jan. 23, 1979

[54] METALLIC QUATERNARY AMMONIUM CARBOXYLATES AS POLYISOCYANURATE CATALYSTS

[75] Inventors: Robert L. Zimmerman, Austin; Howard P. Klein, Houston, both of Tex.

[73] Assignee: Texaco Development Corporation, New York, N.Y.

[21] Appl. No.: 886,209

[22] Filed: Mar. 13, 1978

[51] Int. Cl.$^2$ .................. C08G 18/22; C08G 18/14
[52] U.S. Cl. .................. 521/115; 260/465 D; 260/465.4; 260/501.15; 521/118; 521/902; 528/49
[58] Field of Search .............. 260/2.5 AC, 2.5 AW, 260/77.5 AC, 501.15, 465 D, 465.4

[56] References Cited

U.S. PATENT DOCUMENTS

| | | | |
|---|---|---|---|
| 2,779,689 | 1/1957 | Reis | 260/2.5 AC |
| 2,981,700 | 4/1961 | Parker | 260/2.5 AG |
| 3,010,963 | 11/1961 | Erner | 260/2.5 AC |
| 3,108,975 | 10/1963 | Lambert | 260/2.5 AC |
| 3,726,816 | 4/1973 | Fabris | 260/2.5 AC |
| 3,954,684 | 5/1976 | Farrissey | 260/2.5 AC |
| 3,980,594 | 9/1976 | Fabris | 260/2.5 AC |
| 4,040,992 | 8/1977 | Bechara | 260/2.5 AW |

FOREIGN PATENT DOCUMENTS 2527241  2/1975  Fed. Rep. of Germany ... 260/2.5 AW

*Primary Examiner*—C. Warren Ivy
*Attorney, Agent, or Firm*—Carl G. Ries; Thomas H. Whaley; James L. Bailey

[57] ABSTRACT

Covers the use of metallic quaternary ammonium carboxylate salts as polyisocyanurate catalysts. Said catalysts are useful in promoting the reaction between a polyol and an aromatic polyisocyanate to prepare a polymer containing recurring isocyanurate and urethane linkages.

15 Claims, No Drawings

METALLIC QUATERNARY AMMONIUM CARBOXYLATES AS POLYISOCYANURATE CATALYSTS

BACKGROUND OF THE INVENTION

1. Field of the Invention

This invention relates to the preparation of polyisocyanurate polymers such as polymer foams, and is more particularly concerned with use of a class of catalysts which promote the trimerization of polyisocyanates to polyisocyanurate polymers.

2. Description of the Prior Art

Polyisocyanurate polymers such as rigid polyisocyanurate foams are known in the art. The prior art discloses methods for preparing such polymers by reacting an organic polyisocyanate with a polyol utilizing a polyisocyanurate group formation catalyst. Foams are prepared by effecting such reaction in the presence of a blowing agent. In the optimum situation the isocyanurate catalyst utilized promotes formation of both isocyanurate linkages and urethane linkages to produce urethane-modified polyisocyanurate polymers. See, for example, U.S. Pat. Nos. 3,516,950; 3,580,868; 3,620,986; 3,625,872; 3,635,848; 3,725,319; and 3,745,133.

In particular, the use of quaternary ammonium compounds such as quaternary ammonium hydroxides, alkoxides, and aryl oxides such as phenoxides are disclosed as useful catalysts in reactions involving organic isocyanates, such as in the formation of polyisocyanurates, polyurethanes and polyurethane-polyisocyanurate resins. Representative art includes, for example, German Offen. 2,527,241; U.S. Pat. Nos. 2,779,689; 2,981,700; 3,726,816; 3,010,963; 3,108,975; 3,954,684; 3,892,687; 3,928,256; 3,933,699; and 3,980,594 and U.S. Published Patent Applications Ser. Nos. B497,194 and B490,946.

It has been found here, however, that the use of the above quaternary compounds, particularly in preparing urethane-modified polyisocyanurate polymers have a number of drawbacks. The hydroxides and alkoxides particularly in many instances promote too rapid a reaction, leading to problems of control in preparing the polymers. In other instances, catalysts of this type are not sufficiently heat stable and/or, are relatively incompatible in the polymer-forming systems used. Again, catalysts of this type in some instances are difficult to prepare and their use then becomes somewhat uneconomical. Lastly, many prior art catalysts of this type do not produce the desired high concentration of isocyanurate linkages in the polymer unless relatively large amounts of catalysts are used, and in many cases even use of such high amounts of catalyst does not achieve the desired aim of a polymer containing substantial numbers of isocyanurate linkages.

We have now discovered that these and other drawbacks of prior art catalysts have been overcome by resort to the particular class of polyisocyanurate catalysts defined here.

SUMMARY OF THE INVENTION

This invention comprises a novel process for preparing a polymer containing recurring isocyanurate and urethane linkages, which polymer comprises a reaction product of a polyol and an aromatic polyisocyanate utilizing as a isocyanurate formation catalyst a particularly useful specific class of compounds.

These compounds believed also to be novel comprise quaternary ammonium carboxylate salts which include compounds falling within the following structural formula:

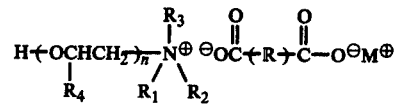

where $R_1$, $R_2$ and $R_3$ individually are radicals selected from the group consisting of alkyl, or substituted alkyl, $R_4$ is a radical substituted from the group consisting of alkyl, substituted alkyl or hydrogen, R is a radical selected from the group consisting of $-(CH_2)_x$,

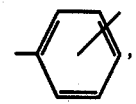

$-CH_2OCH_2-$, $-CH=CH-$, $-C\equiv C-$, and

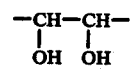

where x is a number of from 0 to 20, n is a number of from 1 to 4, and M is an alkali metal cation.

DETAILED DESCRIPTION OF THE INVENTION

The compounds discovered here are useful polyisocyanurate catalysts. They may be prepared via a number of conventional routes. One particularly useful mode of preparation involves reaction of a tertiary amine, a mono alkali metal salt of a dicarboxylic acid and an alkylene oxide such as propylene oxide or ethylene oxide or a mixture of propylene and ethylene oxides. Usually this procedure is carried out by adding the dicarboxylic acid mono salt such as oxalic acid to an aqueous solution of tertiary amine followed by reaction of the resultant amine-alkali metal disalt product with a compound containing an oxide group. The resultant quaternary ammonium carboxylate can be isolated from the reaction mixture by conventional techniques such as vacuum stripping off of by-product materials. The resultant product may be used in crude form or further refined to give a substantially pure product.

Any tertiary amine may be used here which contains the radicals $R_1$ $R_2$ and $R_3$ individually as set out above. Preferably, said radicals $R_1$, $R_2$, and $R_3$ contain 1-18 carbon atoms, and most preferably are lower alkyl radicals such as ethyl, methyl, isopropyl, butyl, t-butyl, etc. When lower alkyl, these R groups normally contain 1-4 carbon atoms. Thus, representative tertiary amines useful here include, trimethylamine, triethylamine, tripropylamine, triisopropylamine, butyldimethylamine, octyldimethylamine, dodecyldimethylamine, stearyldimethylamine, cetyldimethylamine, distearylmethylamine, dioctylethylamine, tri-t-butylamine.

When $R_1$, $R_2$ and $R_3$ are substituted in one or more occurences they may be substituted with a number of radicals of varying types, as long as said radicals do not interfere with the reaction of the tertiary amine with dicarboxylic acid and oxide. Thus, said groups may be substituted with one or more halo, nitro, cyano, alkyl, and particularly lower alkyl, etc. groups.

The above tertiary amines or others are reacted with a wide variety of alkali metal monosalts of dicarboxylic acids. The alkali metal cation represented by M may be K, Na, Li or Cs but preferably is K or Na.

Typical dicarboxylic acid reactants normally will contain 2–18 carbon atoms, and more often contain 4–12 carbon atoms. These reactants include such dibasic acids as adipic, azelaic, sebacic, isophthalic and terephthalic acids, phthalic and succinic anhydrides, dimethyl terephthalate esters, oxydiacetic acid, fumaric acid, oxalic acid, maleic acid, suberic acid, pimelic acid, glutaric acid, malonic acid, diethylmalonic acid, dimethylmalonic acid, di-n-propylmalonic acid, ethylmalonic acid, ethyl-n-propylmalonic acid, etc.

The oxide reactant which then reacts with the tertiary amine-alkali metal disalt of the dicarboxylic acid may also be chosen from a wide variety of oxides.

Examples of typical oxides useful here include ethylene oxide, 1,2-epoxypropane, isobutylene oxide, 1,2-epoxybutane, 2,3-dimethyl-2,3,-epoxybutane, 2-methyl-2,3-epoxypentane, 1,2-epoxyheptane, 5-methyl-1,2-epoxyhexane 3,4-epoxyheptane, styrene epoxide, 1-cyclohexylepoxyethane, 2-methyl-1,2-epoxyheptane, 1,2-epoxyoctane, 2,4,4-trimethyl-1,2-epoxypentane, 2,4,4-trimethyl-2,3-epoxypentane, 1-phenyl-1,2-epoxypropane, 2-phenyl-1,2-epoxypropane, 1,2-epoxynonane, 1-phenyl-2-methyl-1,2-epoxypropane, 1-phenyl,2-epoxybutane, 4-phenyl-1,2-epoxybutane, 5-phenyl-1,2-epoxypentane, 1,2-epoxydecane, 1(p-tolyl)-1-methyl-3-phenyl-2,3-epoxybutane, 1-phenyl-2-ethyl-1,2-epoxybutane, 1-phenyl-2-methyl-1,2-epoxypentane, 1,2-epoxydodecane, 3-ethoxy-4-propyl-3,4-epoxy-heptane, 1,1-diphenyl-1,2-epoxypropane, 1,2-diphenyl-1,2-epoxypropane, 1,3-diphenyl-1,2-epoxypropane, 1-phenyl-2-(p-tolyl)-epoxyethane, 1-phenyl-1-(m-methoxyphenyl)-epoxyethane, 1-phenyl-1-(o-methoxyphenyl)-epoxyethane, 1′1-diphenyl-2-methyl-1,2-epoxypropane, 2,3-diphenyl-2,3-epoxybutane, 1,1-diphenyl-1,2-epoxybutane, 1,1-di(p-tolyl)-epoxyethane, 1,3-diphenyl-2-methyl-1,2-epoxypropane, 1-phenyl-2-benzyl-1,2-epoxypentane, 1-phenyl-2-benzyl-3-methyl-1,2-epoxybutane, 1,2-epoxyoctadecane, 9,10-epoxyoctadecane styrene oxide, cyclohexene oxide, methoxy and other alkoxy propylene oxides, epichlorohydrin, 3,3-dichloropropylene oxide, 3-chloro-1,2-epoxybutane, 1-chloro-2,3-epoxybutane, 3,4-dichloro-1,2-epoxybutane, 1,4-dichloro-2,3-epoxybutane, 1-chloro-2,3-epoxybutane, and 3,3,3-trichlorobutylene oxide. Generally when an alkylene oxide is used it will contain from 2 up to 18 carbon atoms.

The reaction of an oxide as an alkylene oxide with a basic nitrogen atom such as a tertiary amine to form a quaternary moiety is well known to those skilled in the art, and needs little elaboration.

The reaction of the tertiary amine-alkali metal disalt of the dicarboxylic acid, and oxide compound may be carried over a wide temperature range, say within 50°–200° C. If the oxide is an alkylene oxide in gas form such as ethylene oxide and propylene oxide at the above temperature, the reaction is preferably conducted in a closed vessel under pressure. The particular pressure employed is not critical and autogenous pressures are generally used.

In order to form the represented compounds the reactants must be present in a molar ratio of one mole each of alkylene oxide, tertiary amine and alkali metal monosalt of dicarboxylic acid. Of course, excesses of any of these compounds may also be present without departing from the scope of the invention.

In fact usually excesses of the oxide are present to drive the quaternary formation reaction to completion and minimize formation of the competing ester reaction. Thus, 1–4 moles of oxide be used per mole of disalt, but more often 1–2 moles of oxide are employed per mole of disalt, various reactants. The excess oxide of course, adds to the terminal hydroxyl group to form repeating oxyalkylene units, so that n may range from 1 to 4 as an average number.

The disalt of the dicarboxylic acid may be added by first forming the alkali metal half salt followed by addition of tertiary amine to form the tertiary amine-alkali metal disalt. The reverse sequence may also be followed. In like manner, the disalt may be made simultaneously by adding appropriate amounts of alkali metal hydroxide or other alkali metal bases and tertiary amine to the dicarboxylic acid. Usually, such reaction occurs simultaneously although in some instances heat up to about 100° C. may be employed. Usually, the temperature of salt formation ranges from about 0° C. to about 50° C. Of course, usually, one mole of alkali metal base, and one mole of tertiary amine is employed per mole of dicarboxylic acid.

The catalysts of this invention are particularly advantageous over a seemingly similar catalyst in that they give a slower, more desirable reaction profile during polymer resin preparation and a more complete cure to the final product resin. The catalysts are particularly advantageous in this regard compared to catalysts of seemingly analogous chemical structure of the type described in the prior art cited here.

Thus, the catalysts of the invention are particularly useful in their delayed reaction rates and polymer forming reactions, have good compatibility and solubility in systems used, and are simply and easily prepared. Even more surprising, it was found that a high concentration of isocyanurate linkages are formed in the final polyisocyanurate polymer when yet only small amounts of catalysts are used.

It was particularly surprising to note that the catalysts of this invention desirably have greater solubility in many of the B-components (polyol component) employed in a polyurethane foam mix than do the corresponding dialkali metal salts of the same dicarboxylic acids.

The following examples illustrate preparation of typical compounds in the invention which have excellent activity as polyisocyanurate polymer catalysts. It is understood, of course, that these examples are merely illustrative and that the invention is not to be limited thereto.

EXAMPLE 1

To a 1500 ml. autoclave was added 49.8 g of a 91% potassium hydroxide dissolved in 300 ml of water. To this was charged 104.04 g of fumaric acid followed by 90.9 g of triethylamine. Thus, in this example the alkali metal monosalt was first formed followed by formation of the tertiary amine-alkali metal disalt. The temperature of each salt formation was kept below 50° C. during the additions.

The reaction was then heated to 55° C. and 40.8 ethylene oxide was added over a ten minute period. The reaction was then digested for two hours at 58° C. The material was discharged from the kettle into a threenecked 500 ml flask equipped with a thermometer, distillation head and mechanical stirrer. Under vacuum water was distilled off. When most of the water had been distilled 200 g of diethylene glycol were then added. The stripping was continued until the hot temperature reached 80° C. It was held there at 4 mm of mercury for one hour. The material was then cooled.

EXAMPLE II

Here the procedure of Example I was followed with the exception that 104.04 g of maleic acid was used instead of the fumaric acid.

EXAMPLE III

To a 1500 ml reaction kettle was added 204 g (1.0 moles) potassium acid phthalate, 108 g (6.0 moles) of water and 101 g (1.0 moles) of triethylenediamine. The resulting slurry was heated up to 60°–70° C. under nitrogen to form the disalt.

Thereafter, 88 g (2.0 moles) of ethylene oxide was slowly added while keeping the temperature below 70° C. The excess of ethylene oxide was added in order to maximize formation of quaternary and minimize formation of the competing ester reaction whereby a mono hydroxy ethyl ester is formed. After the addition the mixture was digested at 70°–80° C. until constant pressure was reached. Then the product was stripped at high vacuum to remove 109 g of water and light material. The product was white and viscous and solidified upon cooling. The solid was then conveniently prepared as a solution by adding it to 250 g of a polyethylene glycol.

EXAMPLE IV

The procedure of Example I was repeated with the exception that adipic acid was used.

EXAMPLE V

The procedure of Example I was followed with the exception that oxydiacetic acid was used.

EXAMPLE VI

The procedure of Example I was repeated using oxalic acid.

One class of aromatic polyisocyanates used in the practice of the invention are methylene-bridged polyphenyl polyisocyanate mixtures. These latter isocyanate compounds are generally produced by the phosgenation of corresponding methylene-bridged polyphenyl polyamines, which are conventionally produced by the reaction of formaldehyde and primary aromatic amines, such as aniline, in the presence of hydrochloric acid and/or other acidic catalysts. Known processes for preparing the methylenebridged polyphenyl polyamines and corresponding methylenebridged polyphenyl polyisocyanates therefrom are described in the literature and in many patents, for example, U.S. Pat. Nos. 2,683,730; 2,950,263; 3,012,088; 3,444,162; and 3,352,979.

Most preferred methylene-bridged polyphenyl polyisocyanate mixtures used here contain from about 20 to about 100 weight percent methylene diphenyldiisocyanate isomers with the remainder being polymethylene polyphenyl polyisocyanates having higher functionalities and higher molecular weights. Typical of these are polyphenyl polyisocyanate mixtures containing about 20 to 100 weight percent methylene diphenyldiisocyanate isomers, of which 20 to 95 percent thereof is the 4,4′ isomer, with the remainder being polymethylene polyphenyl polyisocyanates of higher molecular weight and functionality that have an average functionality of from about 2.1 to about 3.5. The isocyanate mixtures are known, commercially available materials and can be prepared by the process described in U.S. Pat. No. 3,362,979, issued Jan. 9, 1968 to Floyd E. Bentley.

Any conventional polyol such as a polyether or polyester polyol may be used in making the isocyanurate polymers here. Illustrative of these one can mention the following types:

(a) Polyalkylene polyols including the adducts of alkylene oxides with, for example, water, ethylene glycol, diethylene glycol, propylene glycol, dipropylene glycol, glycerol, 1,2,6-hexanetriol, 1,1,1-trimethylolethane, 1,1,1-trimethylolpropane, pentaerythritol, sorbitol, sucrose, lactose, alphamethylglucoside, triisopropanolamine, ethylenediamine, diethylenetriamine, novolak resins, phosphoric acid, benzenephosphoric acid, polyphosphoric acids such as tripolyphosphoric acid and tetrapolyphosphoric acid, phenol-aniline-formaldehyde ternary condensation products, aniline-formaldehyde condensation products, and the like. The alkylene oxides employed in producing the polyoxyalkylene polyols normally have from 2 to 4 carbon atoms. Propylene oxide, ethylene oxide or mixtures of propylene oxide with ethylene oxide are preferred. It is known that the random or block structures can be obtained depending upon the particular known procedures used for their preparation.

(b) Polyesters of polyhydric alcohols and polycarboxylic acid such as those prepared by the reaction of an excess of ethylene glycol, propylene glycol, 1,1,1-trimethylolpropane, glycerol, or the like, with phthalic acid, adipic acid, and the like.

(c) Lactone polyols prepared by reacting a lactone such as epsilon-caprolactone or a mixture of epsilon-caprolactone and an alkylene oxide with a polyfunctional initiator such as a polyhydric alcohol, an amine, or an amino-alcohol.

(d) Phosphorus-containing derivatives such as tris(dipropylene)glycol phosphite and other phosphites.

(e) The polymer/polyols produced by the in situ polymerization of a vinyl monomer in a polyol, as disclosed in U.S. Pat. Nos. 3,304,273, 3,383,351 and 3,523,093.

The foregoing are merely illustrative and represent only a small number of the many polyols known in the art that can be employed with the catalyst salts here used in the process of this invention.

The polyol or polyol mixture employed can have a hydroxyl number which can vary over a wide range. In general, the hydroxyl number of the polyols employed can range from about 20, and lower, to about 1000, and higher, preferably from about 20 to 800, and more preferably, from 35 to about 700. The hydroxyl number is defined as the number of milligrams of potassium hydroxide required for the complete neutralization of the hydrolysis product of the fully acetylated derivative prepared from 1 gram of polyol. The hydroxyl number can also be defined by the equation:

$$OH = \frac{56.1 \times 1000 \times f}{M.W.}$$

where, f = average functionality, that is, the average number of hydroxyl groups per molecule of polyol
OH = hydroxyl number of the polyol
M.W. = average molecular weight of the polyol The exact polyol employed depends upon the enduse of the polyisocyanurate polymer. For example, the molecular weight and the hydroxyl number can be selected properly to result in flexible, semi-flexible, semi-rigid or rigid foam products. The polyol preferably possesses a hydroxyl number of from about 200 to about 1000 when employed in rigid formulations, from about 50 to about 250 for semi-flexible foams, and from about 20 to 70 or more when employed in flexible foam formulations. Such limits are not intended to be restrictive, but are merely illustrative of the large number of possible combinations of the polyols that can be employed.

Greatly preferred polyether or polyester polyols have a hydroxyl number within a range of from about 100 to about 500, and a molecular weight from about 100 to about 1000.

Foaming is accomplished by employing in a minor amount (for example, from about 0.5 to 25 weight percent, based on total weight of the reaction mixture), of blowing agents which are vaporized by the exotherm of the isocyanato-reactive hydrogen reaction. The preferred blowing agents are certain halogen-substituted aliphatic hydrocarbons which have boiling points between about 40° C. and 70° C., and which vaporize at or below the temperature of the foaming mass. The blowing agents include, for example, trichloromonofluoromethane, dichlorodifluoromethane, dichlorodifluoromethane, dichloromonofluoromethane, dichloromethane, trichloromethane, bromotrifluoromethane, chlorodifluoromethane, chloromethane, 1,1-dichloro-1-fluoroethane, 1,1-difluoro-1,2,2-trichloroethane, chloropentafluoroethane, 1-chloro-1-fluoroethane, 1-chloro-2-fluoroethane, 1,1,2-trichloro-1, 2,2-trifluoroethane, 1,1,1-trichloro-2,2,2-trifluoroethane, 2-chloro-1,1,1,2,3,3,4,4,4,-nonafluorobutane, hexafluorocyclobutene, and octafluorocyclobutane. Other useful blowing agents include water and low-boiling hydrocarbons such as butane, pentane, hexane, cyclohexane, and the like. Many other compounds easily volatilized by the exotherm of the isocyanatoreactive hydrogen reaction also can be employed. A further class of blowing agents includes the thermally unstable compounds which liberate gases upon heating, such as N,N'-dimethyl-N,N'-dinitrosoterephthalamide.

The amount of blowing agent used will vary with the density desired in the foamed product. In general it may be stated that for 100 grams of reaction mixture containing an average isocyanate/reactive hydrogen ratio of about 1:1, about 0.005 to 0.3 mole of gas are used to provide densities ranging from 30 to 1 pound per cubic foot respectively.

In addition to the above disclosed catalysts an additional isocyanurate group formation catalyst to promote trimerization may also be employed or other catalysts used to promote polyurethane formation. Such catalysts include strong bases, alkali metal salts of carboxylic acids, non-basic metal salts of carboxylic acids and aliphatic tertiary amines. For example, suitable strong bases include quaternary ammonium hydroxides. Suitable alkali metal salts of carboxylic acids include, for example, sodium acetate, potassium octoate, potassium acetate, sodium benzoate, and the like. Examples of suitable tertiary amines are N,N'-diethylpiperazine, N,N'-dimethylpiperazine, trialkylamines such as trimethylamine, triethylenediamine, tributylamine, 2,4,6-tris(dimethylaminomethyl)phenol, and N,N'N''-tris(-dimethylaminopropyl)hexhydro-s-triazine and the like.

The particular amount of the quaternary ammonium carboxylate catalyst employed can vary over a wide range and is not critical so long as it is present in amounts sufficient to promote trimerization of the isocyanatepolyol mixture. Preferably the catalyst is added in an amount of 1-10 percent by weight of catalyst based on the weight of the polymer system such as cellular foam system. More often, the catalyst is most preferably added in an amount of from 2 percent up to about 8 percent by weight, based on the total polymer or foam formulation weight.

If desirable, the isocyanurate polymers such as foams of the invention can be formulated to include flame retardant components to improve the fire retardancy of the foams. Any known fire retardant component compatible with isocyanurate foams can be employed. This would include both the reactive and additive type fire retardants. Representatives of the additive types include halogenated organic phosphates such as tris(chloroethyl)phosphate, tris(2,3-dibromopropyl) phosphate, triphenyl phosphite, diammonium phosphate, and antimony oxide. Representatives of the chemically bound types are diethyl-N,N-bis(2-hydroxyethyl)aminomethyl phosphonate, chlorendic acid derivatives, and phosphorous-containing polyols. When employed, the fire retardant component is added to the above-described isocyanate mixture with some other component or as a preformed mixture with some other component described hereinbefore, in an amount of about 1 to about 20 weight percent of the total foam formulation.

Furthermore, fillers can be employed in the preparation of the isocyanurate polymers, if desired in amounts within the range of about 0.1 to about 20 weight percent of the total polymer formulation. Any conventional filler known in the art to be compatible with isocyanurate polymer manufacture can be employed, such as hydrated alumina, polyethylene, aluminum powder, and various clays and talcs.

An emulsifier or stabilizing agent may also be used in the preparation of the isocyanurate foams of this invention including, for example, sulfonated castor oil or the like. One preferred foam stabilizer is that based on silicone such as, for example, a polydimethyl siloxane or a polyoxyalkylene block copolymer of a silane. The latter type of silicone oil is disclosed in U.S. Pat. No. 2,834,748. Other surfactants or emulsifying or dispersing agents which may be used include ethylene oxide modified sorbitan or monopalmitate or ethylene oxide modified polypropylene ether glycol.

The amount of polyol employed in relation to the organic aromatic polyisocyanate is not critical, but preferably ranges in an amount of from about 0.1 to about 0.8 equivalents per equivalent of polyisocyanate. Optimally, about 0.2 to about 0.6 equivalents per equivalent of polyisocyanate is employed. Moreover, the polyol can be added to the polyisocyanate as a separate component or as a preformed mixture with one or more of the other components.

To prepare isocyanurate foams, the above discussed ingredients may be simultaneously, or independently intimately mixed with each other by the so-called "one-shot" method to provide a foam by a one-step process. Proportions of ingredients are properly adjusted to give flexible, rigid, semi-flexible or semi-rigid foams. In preparing flexible foams usually water is also employed as a part of the blowing agent. In addition to the "one-shot" method the "quasi-prepolymer method" may also be employed. Here, a portion of the polyol is reacted in the absence of a catalyst with the polyisocyanate component. Thereafter to prepare a suitable foam, the remaining portion of the polyol is added and the reaction allowed to go to completion in the presence of catalyst along with other appropriate additives such as blowing agents, foam stabilizing agents, fire retardants, etc.

Again, isocyanurate polymers may be prepared over a wide range of temperatures. However, normally, the reaction is initiated at room temperature, and the only heat involved is that generated by the polymerization itself.

The polyurethane-modified polyisocyanurate compositions may be useful in the preparation of foams, adhesives, binders, laminates, coating, and elastomers of various types. When foams are prepared they may be used as thermal insulation and as building materials and the like.

The quaternary ammonium carboxylate salts prepared were then tested for their activity as catalysts in preparing rigid polyisocyanurate foams. These foams were prepared using formulations shown in Table I. The polyol, catalyst, surfactant and blowing agent were mixed well in the small stoppered bottle to provide the "B" component. The "A" component consisted of a polyisocyanate, which in all cases was Mondur ® MR available from Mobay Chemical Co. This polyisocyante is a mixture of polyaryl isocyanates containing methylenediphenyl diisocyanate and high functional isocyanates. THANOL ® TR-380 polyol available from Jefferson Chemical Co. is a 6.5 mole ethylene oxide adduct of aniline having a OH number of 295. Freon R-11-B is a trichlorofluoromethane blowing agent available from Du Pont. Silicone DC-193, is a surfactant available from Dow Corning which is a silicone-glycol copolymer.

The A and B components were combined in a 2:1 weight ratio and mixed well for 5-15 seconds in a metal can with a high speed stirrer. The mixture was then allowed to rise in the can or poured into a square cardboard box. Measurements were taken during the procedure of cream time, tack-free time and rise time. In cases where foam properties are shown, 600 grams of the foams were cured for 48 hours before cutting the specimens for testing.

Results of the rigid foam preparations and their properties using the catalysts of Examples I-III are given below in Tables I and II.

TABLE I

| FOAM PREPARATIONS | | | |
|---|---|---|---|
| Formulation | 1 | 2 | 3 |
| THANOL ®TR-380 polyol | 18.9 | 18.9 | 18.8 |
| DC-193 silicone | 0.5 | 0.5 | 0.5 |
| Freon R11B | 12.5 | 12.5 | 12.5 |
| Catalyst Ex. I | 1.5 | — | 13 |
| Catalyst Ex. II | — | 1.0 | — |
| Catalyst Ex. III | — | — | 2.0 |
| Mondur MR ® | 66.8 | 66.4 | 65.7 |
| Reaction profile | | | |
| Cream time (sec.) | 10 | 10 | 4 |
| Initial rise time (sec.) | 14 | 14 | 4 |
| Tack free time (sec.) | 27 | 60 | 10 |
| Rise time (sec.) | 70 | 90 | 10 |

TABLE II

| FOAM PROPERTIES | | |
|---|---|---|
| Foam | 1 | 2 |
| Density pcf | 2.12 | 2.06 |
| K-factor | 0.121 | 0.125 |
| Compressive strength | | |
| With rise, psi | 35.93 | 39.00 |
| Cross rise, psi | 12.07 | 12.73 |
| Friability % weight loss | 9.9 | 6.4 |
| Heat distortion, ° C | >225 | >225 |
| % closed cells | 94.09 | 92.7 |
| Butler Chimney | | |
| Average weight retained % | 93.1 | 90.0 |
| Seconds to extinguish | 10.67 | 12.8 |
| Flame height, inches | 6.92 | >11 |
| Dimensional stability (1 week) | | |
| 158° F, 100% rel. humid., vol. %, wt. %, lin. % | +1.3, −2.3, −1.2 | +3.4, −2.5, +2.2 |
| 200° F, dry vol. %, wt. %, lin. % | +3.7, −2.3, +3.0 | +3.9, −1.7, +2.7 |
| −20° F, dry vol. %, wt. %, lin. % | −3.5, −0.3, −2.0 | −3.8, +0.2, −2.0 |

We claim:

1. In a process for preparing a polymer containing recurring isocyanurate and urethane linkages, which polymer comprises the reaction product of a polyol and an aromatic polyisocyanate, while utilizing an isocyanurate group formation catalyst; the improvement which comprises employing as said isocyanurate catalyst a quaternary ammonium carboxylate alkali metal salt which comprises a compound falling within the following structural formula:

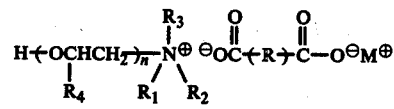

where $R_1$, $R_2$ and $R_3$ individually are radicals selected from the group consisting of alkyl, or substituted alkyl, $R_4$ is a radical substituted from the group consisting of alkyl, substituted alkyl or hydrogen, R is a radical selected from the group consisting of $-(CH_2)_x$,

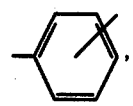

$-CH_2OCH_2-$, $-CH=CH-$, $-C\equiv C-$, and

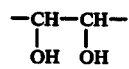

and x is a number of from 0 to 20, n is a number of from 1 to 4, and M is an alkali metal cation.

2. The process of claim 1 wherein said polyol is a polyether or polyester polyol.

3. The process of claim 1 wherein said polymer is a cellular polymer obtained by reacting said polyol and said polyisocyanate in presence of a blowing agent.

4. The process of claim 3 wherein a rigid polyisocyanurate foam is produced.

5. The process of claim 1 wherein R is $-CH_2OCH_2-$.

6. The process of claim 1 where R is $-(CH_2)_x$ and x is 2 or 6.

7. The process of claim 1 where R is $-C\equiv C-$.

8. The process of claim 1 where R is —C≡C—.

9. The process of claim where R is

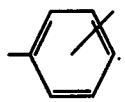

10. A polyisocyanurate catalyst compound having a structural formual as follows:

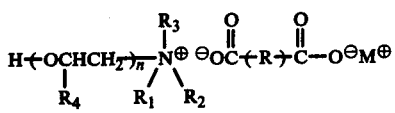

where $R_1$, $R_2$ and $R_3$ individually are radicals selected from the group consisting of alkyl, or substituted alkyl, $R_4$ is a radical substituted from the group consisting of alkyl, substituted alkyl or hydrogen, R is a radical selected from the group consisting of ‒(CH$_2$)$_x$‒,

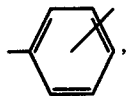

—CH$_2$OCH$_2$—, —CH=CH—, —C≡C—, and

—CH—CH—
 |     |
 OH  OH and x is a number of from 0 to 20, n is a number of from 1 to 4, and M is an alkali metal cation.

11. The compound of claim 10 where R is —CH$_2$OCH$_2$—.

12. The compound of claim 10 where R is ‒(CH$_2$)$_x$‒ and x is 2 or 6.

13. The compound of claim 10 where R is —C≡C—.

14. The compound of claim 10 where R is —CH=CH—.

15. The compound of claim 10 where R is

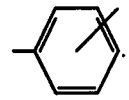

* * * * *